3,851,082
COLLAGEN DISPERSIONS

Robert A. Whitmore, Philadelphia, and Howard W. Jones, New Britain, Pa., assignors to the United States of America as represented by the Secretary of Agriculture
No Drawing. Original application May 19, 1972, Ser. No. 254,958, now abandoned. Divided and this application Aug. 30, 1973, Ser. No. 393,252
Int. Cl. A23j 1/10
U.S. Cl. 426—350     1 Claim

ABSTRACT OF THE DISCLOSURE

Warm dispersions of collagen that are useful as lubricants and binders when used to make extrusion mixtures or pellets of flours and meals and that form gels that do not liquefy when heated are prepared from washed and neutralized hides by comminuting the hide material, warming the comminuted hide usually to above 40° C. and treating the comminuted hide in a high shear field.

---

This is a division of application Ser. No. 254,958, filed May 19, 1972, and now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to warm dispersions of collagen and more particularly to the preparation and application of such dispersions.

Collagen is a high molecular weight, insoluble fibrous protein. As a nonwoven fabric in the form of hides and skins it is ideal for the manufacture of leather. However, the whole hide is not suitable for leather-making purposes and those parts that are not made into leather must be disposed of in other ways. For example, trimmings are processed into gelatin, glue and tankage. In the production of shoe-upper leather the hide is split to produce the desired thickness from the grain side and split from the flesh side is usually in surplus.

Fibrous collagen has some unique physical and chemical properties but the natural state within the hide limits its utility. Consequently, many attempts to convert the fibrous collagen to useful products by chemical and physical modification of the hide structure have been described (U.S. Pats. 2,747,228; 3,126,433; 2,637,321; 1,990,121; 2,919,999; 2,090,902; 2,039,262; 3,373,046; 3,505,084; 3,413,129; 3,425,847 and 3,425,846). However, these continuing efforts have not solved the problem of utilization of surplus fibrous collagen.

Accordingly, it is an object of this invention to provide a means of utilizing the surplus collagen.

Another object of this invention is to provide warm neutral dispersions of collagen that can serve as lubricants and binders when used to make extrusion mixtures or pellets of flours and meals.

Still another object is to provide gels that are impervious to heat, that is gels that do not liquefy when heated.

A still further object is to provide a proteinaceous substitute for a meat product such as bacon.

In general, according to this invention the above objects are accomplished by a process in which washed and neutralized hides are comminuted, warmed to above 40° C. and treated in a high shear field as in a calender, roll mill, valve homogenizer or blender. Dispersions made by the process of this invention form gels which do not melt or lose shape in prolonged soaking or boiling in water.

The following examples are illustrative of this invention without being limiting.

Example 1

Fresh splits from commercially limed and unhaired cattle-hides were used as raw material. The splits were washed, delimed, neutralized and again washed to a pH of about 6.5. Horsed and drained of superficial water, the splits were successively cut in rotary blade cutters and in a comminuting mill fitted with a 0.060 inch cutting head. The product from eight splits contained 28.7% solids which contained about 88% collagen, 10% fat and 0.67% ash. The pH of a water suspension of the solids was about 6.5 or that of the local tap water.

A warm dispersion of the comminuted hide collagen was prepared by heating it with some water in a steam jacketed mixer so that it reached a temperature of 90° C. in about 10 minutes. The slightly viscous mixture was fed into a spring loaded commercial type valve homogenizer having valves set at 1500 p.s.i. in each of two stages and put through the homogenizer twice at about 50° C. The homogenate contained 7% solids and was a viscous liquid which gelled on cooling.

In order to evaluate the usefulness of the homogenate as a feed binder, a control sample of shrimp feed was prepared by mixing dry meal shrimp feed with water to make a thick paste having a pH of 5.8. The thick paste was fed into a meat grinder, extruded through a plate having ⅛" holes, and collected in the form of rods which were air dried and cut into short pellet-sized lengths.

For comparison with the control sample, preparations were made which contained 1%, 3%, 5%, 10%, and 20% (D.B.) of the previously described collagen homogenate mixed with dry meal shrimp feed. The mixture was fed into a meat grinder, extruded at 28° C. through a plate having ⅛ inch holes and dried as described for the control sample. The preparations in which 10% and 20% of the homogenate were mixed with the meal were too soft for good extrusion and drying.

The control pellets disintegrated in water at room temperature (about 22° C.). The pellets made from mixing 1% homogenate with the feed were only a slight improvement over the control. However, the pellets made from mixing 3% and higher amounts of the homogenate with the shrimp feed did not disintegrate in water at temperatures up to 50° C.; they swelled to a firm gel which remained constant on prolonged exposure (48 hours) to water temperatures up to 40° C.

A preparation containing 5% of the collagen homogenate mixed with shrimp feed was made as previously described except that it was extruded from a plate having ¹⁄₁₆ inch holes.

Another preparation containing 5% of the collagen homogenate mixed with a commercial product prepared by growing yeast in and drying to a powder was made as previously described including extruding it through a plate having ¹⁄₁₆ inch holes.

When the above described pelleted preparations containing 3 and 5% of the collagen homogenate were fed to shrimp, the shrimp accepted all the pellets and did not have any difficulty consuming the pellets even after they had swollen to a firm gel. In fact, the shrimp could grasp and hold the pellets better than they could grasp and hold loose feed. Consequently, when pellets were used less feed was wasted.

Example 2

357 gms. of comminuted collagen (28% solids) were heated to 65° C. in a water bath and then dispersed in a blender. 900 gms. of dried sweet whey powder and 150 ml. of water were added and mixed with the dispersed collagen. The mixture containing 70% solids was extruded through a ⅛ inch die, dried and cut into pellets for use as fish and shrimp feed. The pellets swelled but did not dissolve in water.

Example 3

680 gms. of comminuted collagen (28% solids) were heated to 65° C. in a water bath and then dispersed in a blender. 50 ml. of cooking oil were added, and mixed with the dispersed collagen. The mixture was divided and part of it extruded through a ⅛ inch die and part through a 5/64 inch die. The extruded rods were dried and cut into pellets for use as fish and shrimp feed. The pellets swelled but did not dissolve in water.

Example 4

A warm dispersion containing 32% solids was prepared from comminuted hide collagen prepared as in Example 1 by heating it on a steam bath for 3 hours with intermittent stirring. The pH of the dispersion was 5.8. The dispersion was cast into a silicone treated glass plate and dried. The dried film was smooth and translucent and withstood prolonged boiling in water.

Example 5

A warm dispersion a having a pH of 10.5 was made by adding ammonium hydroxide while dispersing the comminuted hide. Part of the dispersion did not gel on cooling but separated into fiber and fluid. This was discarded. The remainder of the dispersion was heated to 70° C. and mixed at high speed in a blender. A dried, cast film of the dispersion withstood boiling in water.

Example 6

A warm dispersion containing 6% solids and having a pH of 3.7 was made. The product was a fibrous paste which did not gel on cooling at 8° C. The product was warmed and stirred in a blender where at about 39 to 40° C. it underwent a transition from paste to fluid which formed a firm gel at room temperature. The gel did not dissolve in boiling water.

Example 7

A 6% warm collagen dispersion having a pH of 5.6 was prepared in a blender and then heated to 70° C. for one hour. The temperature of the dispersion was then lowered to 50° C. and a volume of cooking oil equal to the volume of the dispersion was added and mixed vigorously to emulsify the oil in the dispersion. On cooling, the oil emulsified dispersion set to a firm gel.

The procedure above was repeated except that lard was substituted for the cooking oil.

A slice of the gel from each of the above experiments was fried at 170° C. without the aid of any additional fat, oil or lubricating aid. Shrinkage during frying was only about 20% demonstrating that these products could be used as bacon substitutes.

We claim:

1. A process for preparing a proteinaceous substitute for a meat product such as bacon, comprising the following steps:
   (a) preparing a viscous liquid collagen dispersion having a pH of about 5.6, containing about 6.0 to 7.0% solids, and that is capable of forming a gel which will not melt upon prolonged boiling in water;
   (b) heating the collagen dispersion to about 70° C. for about one hour, and then lowering the temperature of the dispersion to about 50° C.;
   (c) adding to the dispersion of step (b) a volume of cooking oil about equal to one volume of the dispersion;
   (d) mixing the mixture of step (c) to emulsify the oil in the dispersion; and
   (e) cooling the oil emulsified dispersion to produce a firm proteinaceous product that, while withstanding a frying temperature of about 170°, retains its firmness and shrinks less than about 20%.

References Cited

UNITED STATES PATENTS

| | | | |
|---|---|---|---|
| 3,108,873 | 10/1963 | Durst | 426—199 |
| 3,658,550 | 4/1972 | Hawley | 426—350 |
| 3,293,237 | 12/1966 | Wiegand | 106—125 |
| 2,676,168 | 4/1954 | Torr | 260—118 |

RAYMOND N. JONES, Primary Examiner

R. A. YONCOSKIE, Assistant Examiner

U.S. Cl. X.R.

426—167, 199, 362, 364, 802